United States Patent
Shimazu

(10) Patent No.: US 9,019,519 B2
(45) Date of Patent: Apr. 28, 2015

(54) RECORDING APPARATUS

(71) Applicant: Seiko Epson Corporation, Tokyo (JP)

(72) Inventor: Masamitsu Shimazu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/933,671

(22) Filed: Jul. 2, 2013

(65) Prior Publication Data

US 2014/0009777 A1 Jan. 9, 2014

(30) Foreign Application Priority Data

Jul. 6, 2012 (JP) .................................. 2012-152155

(51) Int. Cl.
| | | |
|---|---|---|
| *G06F 3/12* | (2006.01) | |
| *H04N 1/04* | (2006.01) | |
| *H04N 1/00* | (2006.01) | |

(52) U.S. Cl.
CPC ....... *H04N 1/00525* (2013.01); *H04N 1/00278* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,123,210 B1* | 2/2012 | Murray | ......................... | 271/4.04 |
| 2005/0099480 A1* | 5/2005 | Saito et al. | .................... | 347/104 |
| 2005/0195445 A1* | 9/2005 | Terada | ........................... | 358/296 |
| 2005/0195449 A1* | 9/2005 | Hattori et al. | .................. | 358/474 |
| 2006/0092194 A1* | 5/2006 | Yamaguchi | ........................ | 347/2 |
| 2007/0024924 A1* | 2/2007 | Ikeno et al. | .................. | 358/474 |
| 2007/0177226 A1* | 8/2007 | Ishida et al. | .................. | 358/474 |
| 2011/0310207 A1* | 12/2011 | Ito et al. | ........................ | 347/104 |
| 2012/0086967 A1* | 4/2012 | Hara et al. | ................... | 358/1.13 |
| 2012/0105920 A1* | 5/2012 | Murray | ........................ | 358/474 |
| 2012/0120461 A1* | 5/2012 | Oshima et al. | ................ | 358/474 |
| 2013/0002778 A1* | 1/2013 | Olson et al. | .................... | 347/104 |

FOREIGN PATENT DOCUMENTS

JP 2012-107393 6/2012

* cited by examiner

*Primary Examiner* — King Poon
*Assistant Examiner* — Vincent Peren
(74) *Attorney, Agent, or Firm* — Workman Nydegger

(57) ABSTRACT

An ink jet printer is a multifunctional recording apparatus in which a scanner unit is coupled to a recording unit in a rotationally movable manner. The scanner unit includes a protrusion. A carriage, the protrusion, and a rotational movement shaft of the scanner unit are arranged in this order from the unit front side to the unit rear side in the unit depth direction.

9 Claims, 6 Drawing Sheets

RECORDING APPARATUS

BACKGROUND

1. Technical Field

The present invention relates to a recording apparatus including a recording unit and a scanner unit that is provided at the upper side of the recording unit and is moved rotationally so as to open and close the upper side of the recording unit.

2. Related Art

In recent years, recording apparatuses called complex machines that include a recording unit and a scanner unit integrally, in particular, ink jet complex machines among them, have been spread widely. The scanner unit includes a reading unit and the reading unit is guided in the scanning direction by a guide rail.

As for configuration layout, the scanner unit is provided with a protrusion projecting from a bottom surface and the guide rail is arranged in the protrusion in some cases. Employing the configuration, the thickness of the overall scanner unit can be reduced and the dimension of the overall ink jet complex machine in the apparatus height direction can be reduced. JP-A-2012-107393 discloses an ink jet complex machine including such protrusion.

Recently, the ink jet complex machine is required to be reduced in size further. In particular, the ink jet complex machine is required to be reduced in height significantly (dimension thereof in the apparatus height direction is required to be reduced). On the other hand, since the scanner unit includes the reading unit, it is required to have higher resistance to vibration and impact.

SUMMARY

An advantage of some aspects of the invention is to provide a multifunctional recording apparatus which is capable of being reduced in height and is configured in view of resistance to vibration and impact.

A recording apparatus according to a first aspect of the invention includes a recording unit that includes a recording head for performing recording, and a scanner unit that is provided at an upper side of the recording unit and is moved rotationally so as to open and close the upper side of the recording unit. In the recording apparatus, the recording unit includes a carriage that is movable in a scanning direction of the recording head, and a medium accommodation portion for feeding a medium from a bottom portion, the scanner unit includes a protrusion that projects from a bottom surface, and the carriage, the protrusion, a rotational movement shaft of the scanner unit are arranged in this order from a unit front side to a unit rear side in a depth direction of the recording unit and the scanner unit, that is, a direction intersecting with the scanning direction of the recording head and the reading unit.

According to the aspect of the invention, first of all, the protrusion of the scanner unit and the carriage are arranged so as to be shifted in the unit depth direction. Therefore, the protrusion and the carriage are not required to be arranged in a superimposed manner. This makes it possible to reduce the apparatus in height in comparison with a configuration in which the protrusion and the carriage are arranged in the superimposed manner.

A recording apparatus according to a second aspect of the invention includes a recording unit that includes a recording head for performing recording, and a scanner unit that is provided at an upper side of the recording unit and is moved rotationally so as to open and close the upper side of the recording unit. In the recording apparatus, the recording unit includes a carriage that is movable in a scanning direction of the recording head and an inverse roller that inverts a medium on a unit rear portion in a depth direction, the scanner unit includes a protrusion that projects from a bottom surface, and the carriage, the protrusion, a rotational movement shaft of the scanner unit are arranged in this order from a unit front side to a unit rear side in the depth direction of the recording unit and the scanner unit, that is, a direction intersecting with the scanning direction of the recording head and the reading unit.

According to the aspect of the invention, first of all, the protrusion of the scanner unit and the carriage are arranged so as to be deviated in the unit depth direction. Therefore, the protrusion and the carriage are not required to be arranged in a superimposed manner. This makes it possible to reduce the apparatus in height in comparison with a configuration in which the protrusion and the carriage are arranged in the superimposed manner.

In the recording apparatus according to a third aspect of the invention, it is preferable that the protrusion be arranged at a side of the rotational movement shaft relative to a center position of the scanner unit in the depth direction.

Next, a guide portion for guiding the reading unit is arranged on the protrusion. Therefore, a weight tends to be increased at the position of the protrusion and a gravity center position of the scanner unit tends to be closer to the position of the protrusion. However, the protrusion is arranged at the side of the rotational movement shaft of the scanner unit relative to the center position of the scanner unit in the unit depth direction. Therefore, the movement amount of the protrusion with the rotational movement of the scanner unit, that is, the movement amount of the gravity center position of the scanner unit can be suppressed to be small.

This makes it possible to suppress impact and vibration when the scanner unit is opened and closed and move the scanner unit rotationally with a weak force. As described above, according to the aspect of the invention, a multifunctional recording apparatus that is capable of being reduced in height and is configured in view of resistance to vibration and impact can be obtained.

According to a fourth aspect of the invention, in the recording apparatus according to the first and second aspects of the invention, it is preferable that the carriage and the protrusion be overlapped in a height direction of the recording unit and the scanner unit.

According to the aspect of the invention, the carriage and the protrusion are overlapped in the unit height direction. This makes it possible to reduce the apparatus in height in comparison with a configuration in which the carriage and the protrusion are arranged in the superimposed manner.

According to a fifth aspect of the invention, in the recording apparatus according to the first or second aspect of the invention, it is preferable that the recording unit include an inverse roller that inverts a medium on a unit rear portion in the depth direction, and the protrusion and the inverse roller be arranged so as to be shifted in the depth direction.

The inverse roller that inverts the medium has a large diameter by nature in many cases and requires a large occupying space in the apparatus. According to the aspect of the invention, the protrusion and the inverse roller are arranged so as to be shifted in the depth direction. Therefore, the protrusion and the inverse roller are not required to be arranged in a superimposed manner. This makes it possible to reduce the apparatus in height in comparison with a configuration in which the protrusion and the inverse roller are arranged in the superimposed manner.

According to a sixth aspect of the invention, in the recording apparatus according to the first or second aspect of the invention, it is preferable that the recording unit include an inverse unit that inverts the medium on a unit rear portion in the depth direction in a detachable manner, and the protrusion be overlapped with a part of the inverse unit in a height direction.

According to the aspect of the invention, the protrusion is overlapped with a part of the inverse unit in a height direction. This makes it possible to reduce the apparatus in height in comparison with a configuration in which the protrusion and the inverse unit are arranged in the superimposed manner.

According to a seventh aspect of the invention, in the recording apparatus according to the first to fourth aspects of the invention, it is preferable that a guide portion for guiding the reading unit and a scanner motor portion for driving the reading unit be formed on a part of the protrusion, and the scanner motor portion be arranged on a recess at an upper portion of the recording unit in a state where the scanner unit is closed.

According to an eighth aspect of the invention, it is preferable that a transportation path of the medium from an outer circumferential surface of the inverse roller to the recording head be linear.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention is described based on the drawings. The invention is not limited to the embodiment as will be described below and various variations can be made within the scope of the invention as described in the scope of the invention. Hereinafter, the embodiment of the invention is described under the assumption that these variations are also encompassed in the scope of the invention.

Figure 1:
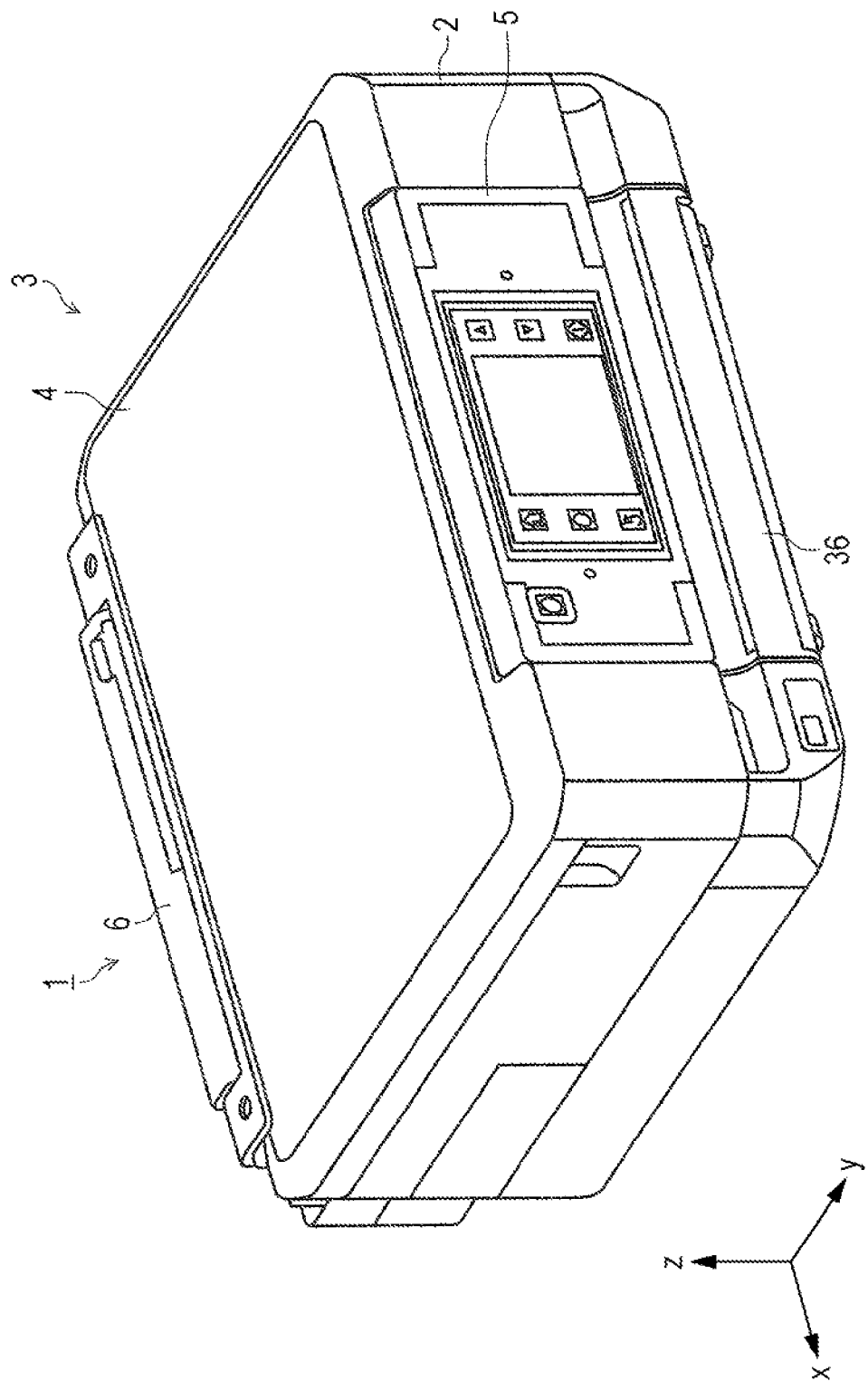
FIG. 1 is an outer perspective view illustrating a printer according to the invention.
Figure 2:
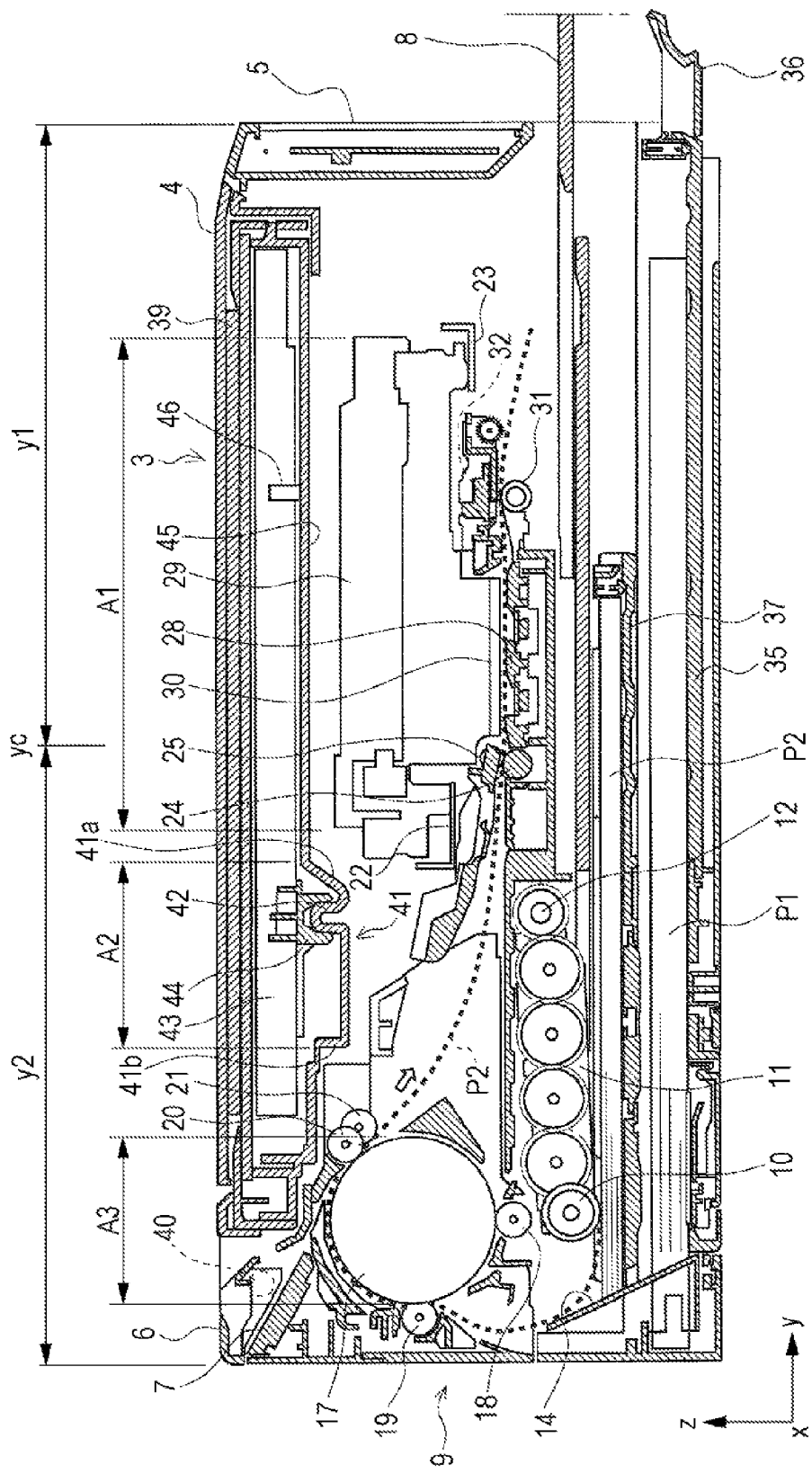
FIG. 2 is a side cross-sectional view illustrating a paper transportation path of the printer according to the invention.
Figure 3:
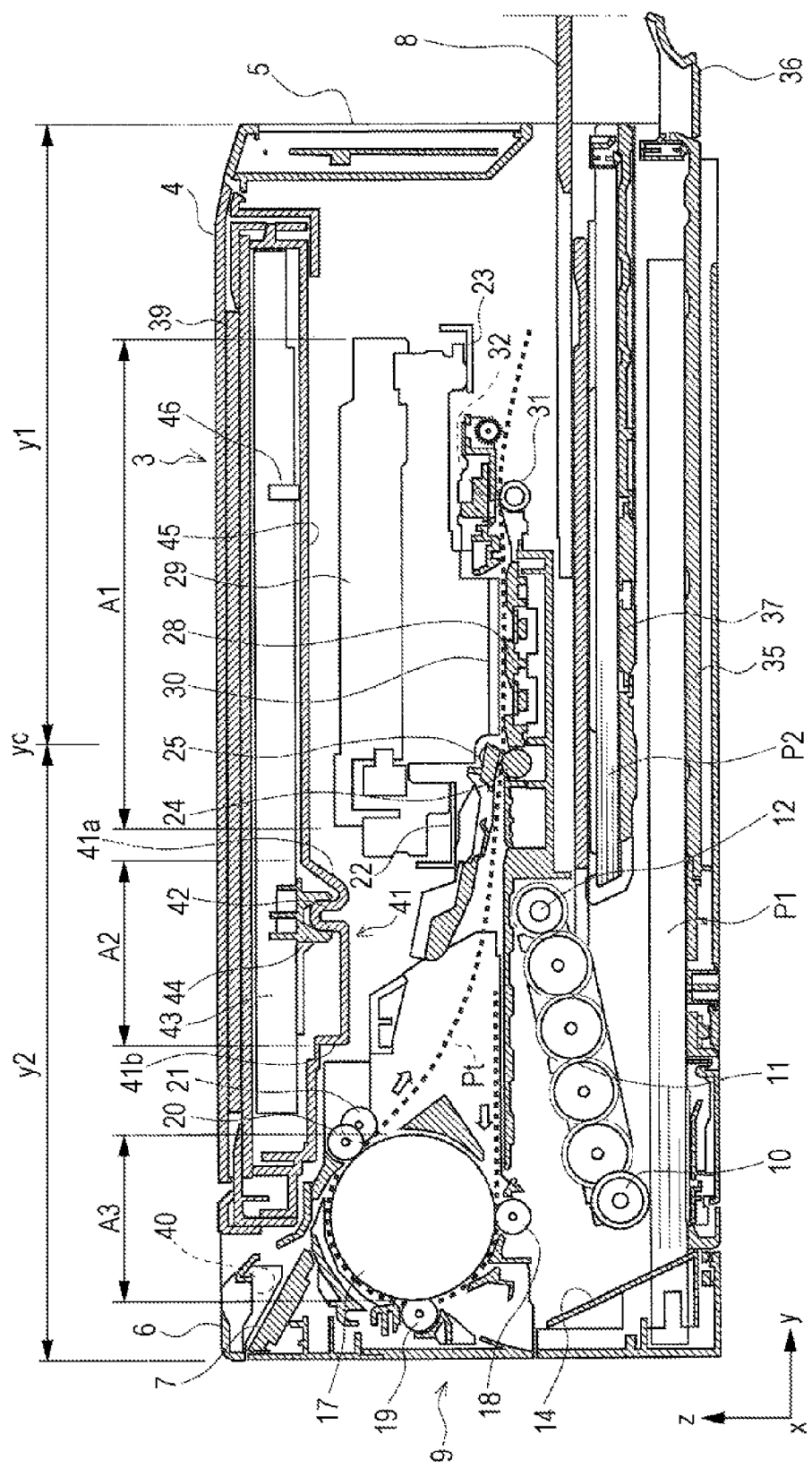
FIG. 3 is a side cross-sectional view illustrating the paper transportation path of the printer according to the invention.
Figure 4:
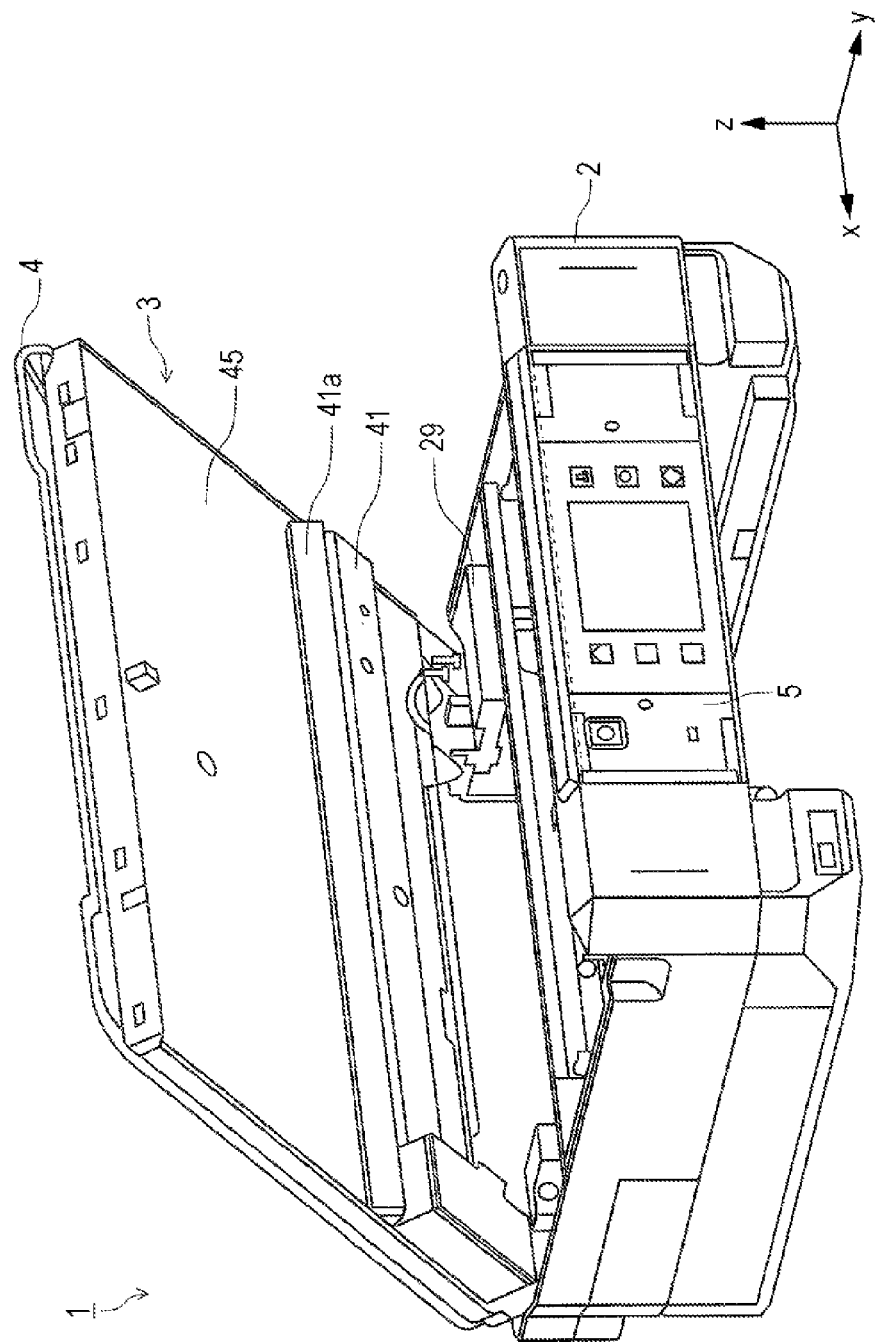
FIG. 4 is an outer perspective view illustrating the printer according to the invention.
Figure 5:
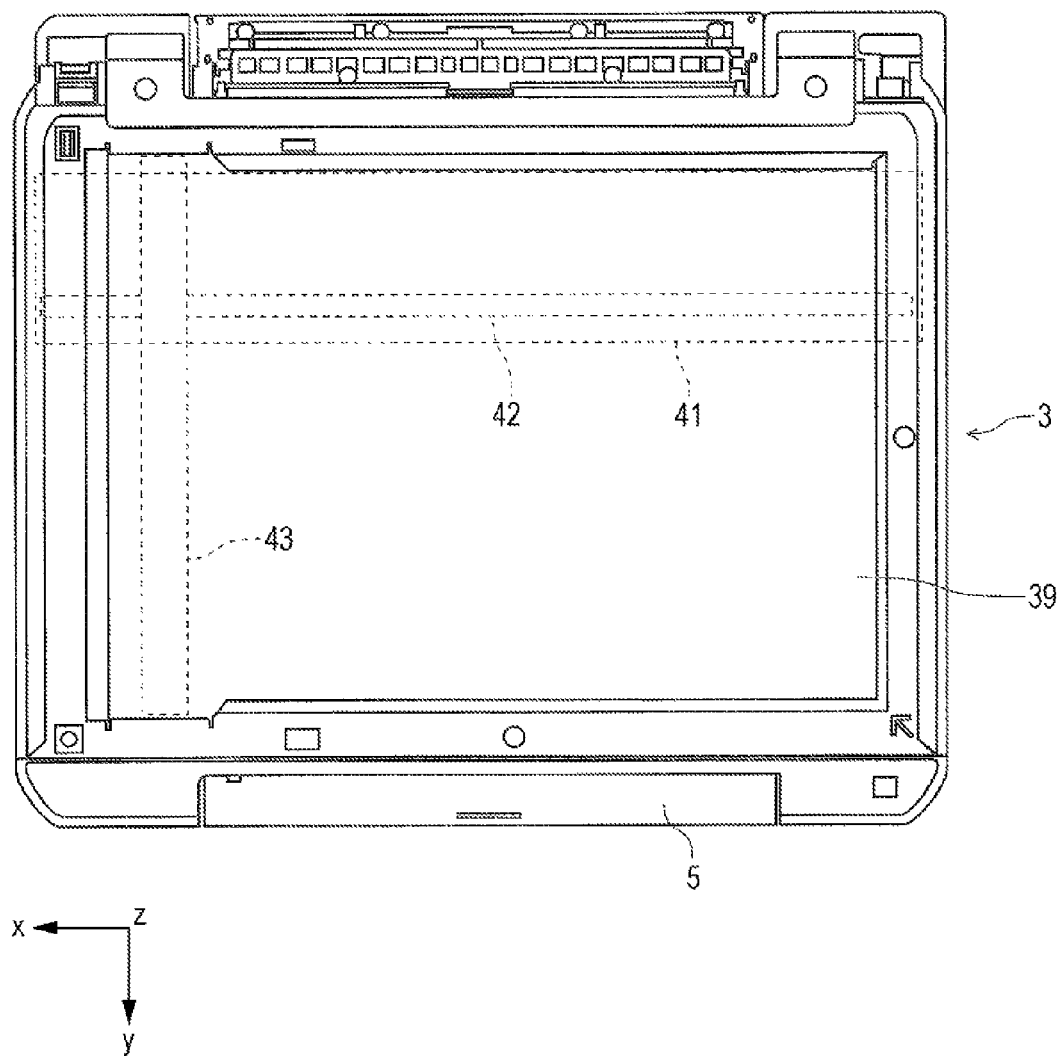
FIG. 5 is a plan view illustrating a scanner unit constituting the printer according to the invention.
Figure 6:
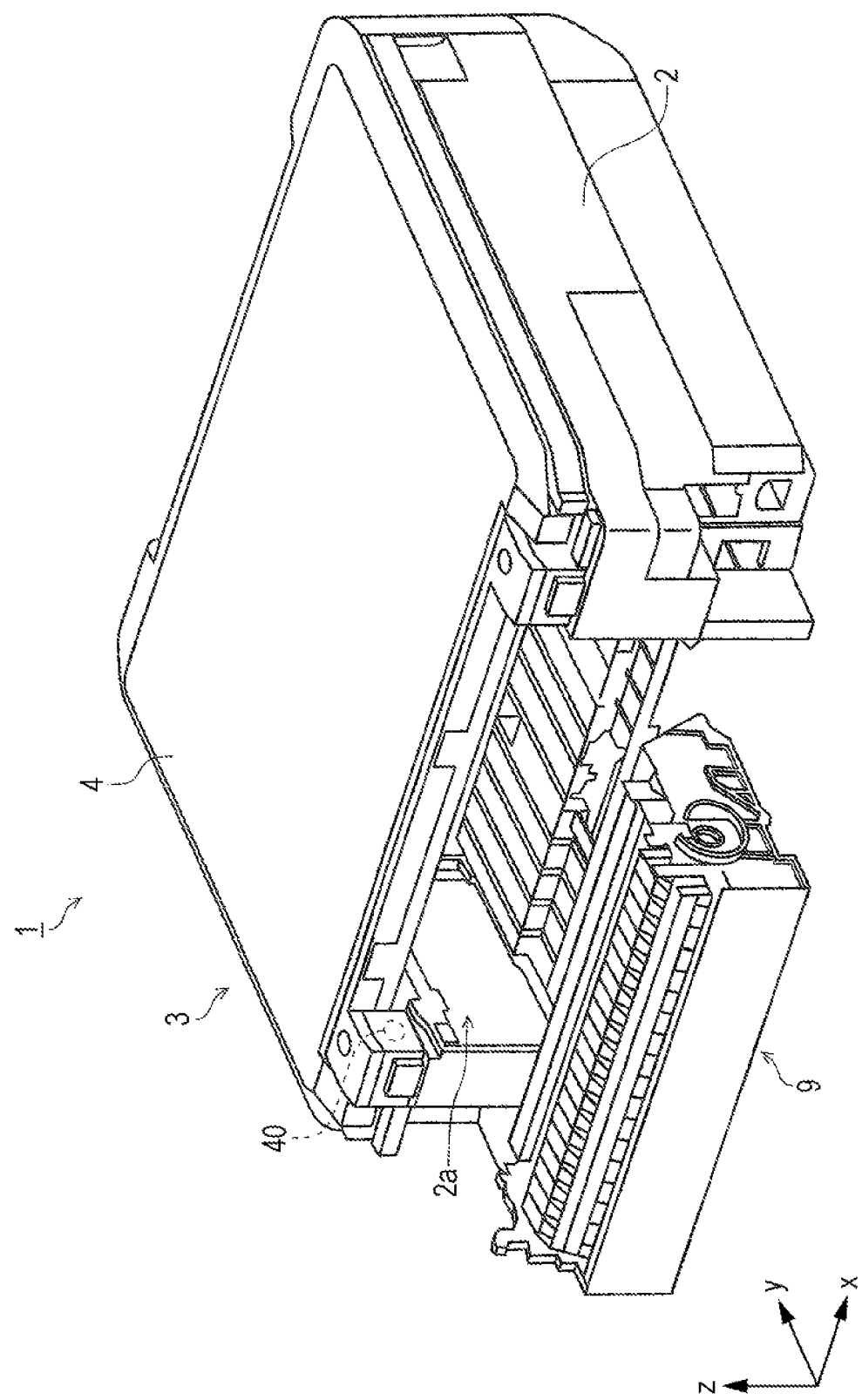
FIG. 6 is an outer perspective view illustrating the printer according to the invention.

FIG. 1, FIG. 4, and FIG. 6 are outer perspective views illustrating an ink jet printer (hereinafter, referred to as "printer") 1 as an embodiment of a "recording apparatus" according to the invention. FIG. 1 and FIG. 4 are views illustrating the printer 1 when seen from the front side. FIG. 6 is a view illustrating the printer when seen from the rear side. FIG. 2 and FIG. 3 are side cross-sectional views illustrating a paper transportation path of the printer 1. Further, FIG. 5 is a plan view illustrating a scanner unit 3. FIG. 4 illustrates a state where the scanner unit 3 is opened, FIG. 5 illustrates a state where a document cover 4 of the scanner unit 3 is opened, and FIG. 6 illustrates a state where an inverse unit 9 is detached from the printer 1.

It is to be noted that in an x-y-z coordinate system as illustrated in FIG. 1 to FIG. 6, the x direction indicates the width direction of the apparatus (unit), the y direction indicates the depth direction of the apparatus (unit), and the z direction indicates the height direction of the apparatus (unit). The side at which an operation panel 5 is provided corresponds to the front side of the apparatus (unit) and the side opposite thereto corresponds to the rear side of the apparatus (unit) in the y direction as the unit depth direction. In the respective drawings, constituent components of the printer 1 are omitted appropriately.

Hereinafter, the overall configuration of the printer 1 is outlined first. The printer 1 includes the scanner unit 3 in a rotationally movable manner on the upper side of a recording unit 2 that performs ink jet recording onto recording paper as an example of a medium. That is to say, the printer 1 is configured as an ink jet complex machine having a scanner function in addition to an ink jet recording function.

The scanner unit 3 is coupled to the recording unit 2 through a rotational movement shaft 40 (FIG. 2, FIG. 3, FIG. 6) in a rotationally movable manner. The scanner unit 3 is moved rotationally so as to be in a close state (FIG. 1) and an open state (FIG. 4).

An upper cover 4 on the scanner unit 3 is a cover that can be opened and closed. If the cover 4 is opened, a document table 39 (FIG. 2, FIG. 3, FIG. 5) of the scanner unit 3 is exposed.

The reference numeral 5 on the front surface of the apparatus indicates the operation panel constituted by including a power supply button, operation buttons for performing various print settings and executing recording, a display unit on which print setting contents and preview of a print image are displayed, and the like. The aperture panel 5 is configured so as to be tilted and can be adjusted to an angle at which a user can operate the operation panel 5 easily. It is to be noted that an opening angle of the operation panel 5 is kept by an angle keeping unit (not illustrated) and the angle is kept even when an external force in the closing direction is applied to the operation panel 5 for operating buttons.

A reference numeral 36 on the front surface of the apparatus indicates a cover that is provided on a lower-stage tray 35 and can be opened and closed. FIG. 1 illustrates a state where the cover 36 is closed. FIG. 2 and FIG. 3 illustrate a state where the cover 36 is opened. If the cover 36 is opened, the lower-stage tray 35 as a medium accommodation portion, an upper-stage tray 37, and a discharged paper receiving tray 8 can be exposed. In this state, detachment and attachment operations of the lower-stage tray 35 and the upper-stage tray 37 and a sliding operation of the discharged paper receiving tray 8 can be executed.

The discharged paper receiving tray 8 is provided so as to be displaced between an accommodated position (FIG. 1) and a projecting position (FIG. 2, FIG. 3) in a sliding manner by a motor (not illustrated). At the accommodated position, the discharged paper receiving tray 8 is accommodated in the recording unit 2. At the projecting position, the discharged paper receiving tray 8 projects to the front side of the recording unit 2. When the discharged paper receiving tray 8 is located at the projecting position at which it projects to the front side of the recording unit 2, the discharged paper receiving tray 8 can receive recording paper on which recording has been performed and discharged.

The lower-stage tray 35 and the upper-stage tray 37 provided at the upper side of the lower-stage tray 35 can accommodate a plurality of pieces of recording paper and can be attached to the recording unit 2 in a detachable manner. The above-mentioned cover 36 is provided on the lower-stage tray 35 in a rotationally movable manner.

Subsequently, a reference numeral 6 on the upper rear portion of the recording unit 2 indicates a manual feed cover that can be opened and closed. If the manual feed cover 6 is opened, paper feeding of recording paper can be performed by manual feeding by using a manual feed tray 7 (FIG. 2, FIG. 3).

Subsequently, the paper transportation path of the printer 1 is described with reference to FIG. 2 and FIG. 3 mainly. The printer 1 according to the embodiment includes the lower-stage tray 35 and the upper-stage tray 37 on the bottom portion of the apparatus. The printer 1 feeds recording paper from the lower-stage tray 35 or the upper-stage tray 37 one by one.

The upper-stage tray 37 is provided so as to be displaced between a feedable position (FIG. 2) and a retreat position (FIG. 3) in a sliding manner. The upper-stage tray 37 is configured so as to be displaced between the feedable position and the retreat position when receiving a driving force of a motor (not illustrated).

In FIG. 2 and FIG. 3, paper accommodated in the lower-stage tray 35 is indicated by a reference symbol P1 and paper accommodated in the upper-stage tray 37 is indicated by a reference symbol P2 (hereinafter, paper is referred to as "paper P" unless they are required to be distinguished particularly).

A feeding roller (also referred to as pickup roller) 10 that is driven rotationally by a motor (not illustrated) is provided on a swing member 11 that swings about a rotational movement shaft 12. In a state where the upper-stage tray 37 slides to the front-most side of the apparatus (right side in FIG. 2 and FIG. 3: drawing direction side of the upper-stage tray 37), that is, when the upper-stage tray 37 is at the retreat position (FIG. 3), the feeding roller 10 rotates while making contact with uppermost paper P1 accommodated in the lower-stage tray 35 so as to feed out the uppermost paper P1 from the lower-stage tray 35.

Further, when the upper-stage tray 37 slides to the rear-most side of the apparatus (left side in FIG. 2: attachment direction side of the upper-stage tray 37 and paper feed-out direction side) to be located at an abutment position (state in FIG. 2), that is, at a position that is capable of paper-feeding of the upper-stage tray 37, the feeding roller 10 rotates while making contact with uppermost paper P2 accommodated in the upper-stage tray 37 so as to feed out the uppermost paper P2 from the upper-stage tray 37. It is to be noted that a dashed line in FIG. 2 indicates a passage trajectory of the paper P2 fed out from the upper-stage tray 37.

A separation inclined surface 14 is provided at a position opposed to front ends of the lower-stage tray 35 and the upper-stage tray 37. The paper P to be fed out from the lower-stage tray 35 or the upper-stage tray 37 advances to the downstream side while the front end of the paper P makes contact with the separation inclined surface 14. With this, the uppermost paper P to be fed and pieces of subsequent paper P are separated.

An inverse roller 17 that is driven rotationally by a motor (not illustrated) is provided at the downstream side of the separation inclined surface 14. The paper P is bent and inverted by the inverse roller 17 to advance to the apparatus front side. It is to be noted that reference numerals 18, 19, 20, and 21 indicate driven rollers that can be driven rotationally. The paper P fed out from at least each tray is nipped by the driven roller 19 and the inverse roller 17 and nipped by the driven roller 20 and the inverse roller 17 again so as to be fed to the downstream side.

A transportation driving roller 24 and a transportation driven roller 25 are provided at the downstream side of the inverse roller 17. The transportation driving roller 24 is driven rotationally by a motor (not illustrated). The transportation driven roller 25 is driven rotationally while making contact with the transportation driving roller 24. The paper P is fed to the lower side of a recording head 30 by these rollers.

Subsequently, the recording head 30 that discharges ink is provided on a bottom portion of a carriage 29. The recording head 30 constitutes a recording unit that performs recording. The carriage 29 is driven so as to reciprocate in the scanning direction of the recording head 30 (x direction: front-rear direction of the paper plane of FIG. 2) by a motor (not illustrated). In this case, the carriage 29 is driven so as to reciprocate while being guided (supported) by a first guide plate 22 provided at a rear portion and a second guide plate 23 provided at a front portion.

A support member 28 is provided at a position opposed to the recording head 30. The support member 28 defines a space between the paper P and the recording head 30. A discharge unit including a discharge driving roller 31 and a discharge driven roller 32 is provided at the downstream side of the support member 28. The discharge driving roller 31 is driven rotationally by a motor (not illustrated). The discharge driven roller 32 is driven rotationally while making contact with the discharge driving roller 31. The paper P on which recording has been performed by the recording head 30 is discharged to the above-mentioned discharged paper receiving tray 8 by these rollers.

The recording unit 2 includes an inverse unit 9 on a rear portion of the apparatus in a detachable manner. The inverse unit 9 is a unit body including the inverse roller 17 and the driven rollers 18 to 21. The inverse unit 9 is configured so as to be attached to and detached through an opening 2a (FIG. 6) on a rear portion of the apparatus. With this, when paper jam occurs on the paper transportation path, jammed paper can be detached easily by detaching the paper inverse unit 9.

Further, the recording unit 2 can execute recording on the rear surface (second surface) of paper P in the following manner. That is, the recording unit 2 back-feeds and transports the paper P on which recording has been performed on the front surface thereof to the inverse roller 17 without discharging the paper P, so that the paper P is bent and inverted by the inverse roller 17. Then, the recording unit 2 can execute recording on the rear surface. A dashed line indicated by a reference symbol Pt in FIG. 3 indicates a passage trajectory of the paper to be bent and inverted.

Subsequently, the configuration of the scanner unit 3 is described. The scanner unit 3 is coupled to the recording unit 2 through the rotational movement shaft 40 (FIG. 2, FIG. 3, FIG. 6) in a rotationally movable manner. If the scanner unit 3 is moved rotationally, an upper portion of the recording unit 2 is opened and closed. In the state where the scanner unit 3 is opened, a user can access the inner portion of the recording unit 2. In this state, a user can perform an exchange operation of an ink cartridge (not illustrated) mounted on the carriage 29 and paper jam processing, for example.

The scanner unit 3 is provided with a reading unit 43 that scans along the x direction as the same direction as the scanning direction of the recording head 30. The reading unit 43 is constituted by mounting an image sensor such as a contact image sensor (CIS) and a charge coupled device (CCD) thereon.

The reading unit 43 has a shape elongated in the y direction. The reading unit 43 moves in the x direction by being guided by a guide rail 42 as a guide portion extended in the x direction while receiving a driving force from a driving source (not illustrated). It is to be noted that a reference numeral 44 on the reading unit 43 indicates a to-be-guided portion that makes contact with the guide rail 42 in a sliding manner. Further, a reference numeral 46 indicates a driven roller that is driven rotationally while making contact with an inner bottom portion of the scanner unit 3. The posture in parallel of the reading unit 43 with the document table 39 is kept by the to-be-guided portion 44 and the driven roller 46.

A protrusion 41 extending in the x direction is provided on a bottom surface 45 of the scanner unit 3 so as to project to the side of the recording unit 2 from the bottom surface 45. The protrusion 41 is a protrusion for arranging the guide rail 42. An occupation region of the protrusion 41 in the unit depth direction (y direction) is formed by an inclined surface 41a facing a travelling region of the carriage 29 and a perpendicular surface 41b facing the inverse unit 9.

In the configuration of the printer 1 as described above, a reference symbol A1 in FIG. 2 and FIG. 3 indicates an occupation region of the carriage 29 in the unit depth direction (y direction). A reference symbol A2 indicates an occupation region of the protrusion 41. Further, a reference symbol A3 indicates an occupation region of the inverse roller 17.

As illustrated in the drawings, in the printer 1 according to the embodiment, the carriage 29, the protrusion 41, the rotational movement shaft 40 of the scanner unit 3 are arranged in this order from the unit front side (right side in FIG. 2 and FIG. 3) to the unit rear side (left side in FIG. 2 and FIG. 3) in the unit depth direction. The protrusion 41 is arranged at the side of the rotational movement shaft 40 relative to a center position (position Yc (y1=y2) in FIG. 2 and FIG. 3) of the scanner unit 3 in the unit depth direction.

That is to say, the protrusion 41 of the scanner unit 3 and the carriage 29 are arranged so as to be shifted in the unit depth direction. Therefore, the protrusion 41 and the carriage 29 are not required to be arranged in a superimposed manner. Accordingly, the carriage 29 and the protrusion 41 can be overlapped with each other in the height direction (z direction). Therefore, according to the embodiment, the apparatus can be reduced in height in comparison with a configuration in which the protrusion 41 and the carriage 29 are arranged in the superimposed manner.

Next, the guide rail 42 for guiding the reading unit 43 is arranged on the protrusion 41. Therefore, a gravity center position of the scanner unit 3 is made closer to the position of the protrusion 41 in the unit depth direction. Further, the protrusion 41 is arranged at the side of the rotational movement shaft 40 relative to the center position Yc of the scanner unit 3 in the unit depth direction. Therefore, a movement amount of the protrusion 41 with the rotational movement of the scanner unit 3, that is, a movement amount of the gravity center position of the scanner unit 3 can be suppressed to be small.

This makes it possible to suppress impact and vibration when the scanner unit 3 is opened and closed and move the scanner unit 3 rotationally with a weak force. As described above, with the printer 1 according to the embodiment, a multifunctional ink jet recording apparatus that can be reduced in height and is configured in view of resistance to vibration and impact can be obtained.

The printer 1 includes the inverse unit 9 on the rear portion of the apparatus in a detachable manner as described above. As is obvious from FIG. 2 and FIG. 3, the protrusion 41 and the inverse roller 17 are arranged so as to be shifted in the unit depth direction. Therefore, the protrusion 41 and the inverse roller 17 are not required to be arranged in a superimposed manner and can be overlapped in the height direction. This makes it possible to reduce the apparatus in height in comparison with a configuration in which the protrusion 41 and the inverse roller 17 are arranged in the superimposed manner.

Further, in the embodiment, the protrusion 41 is overlapped on a part of the inverse unit 9 in the height direction. This makes it possible to reduce the apparatus in height in comparison with a configuration in which the protrusion 41 and the inverse unit 9 are arranged in the superimposed manner.

The entire disclosure of Japanese Patent Application No. 2012-152155, filed Jun. 6, 2012 is expressly incorporated by reference herein.

What is claimed is:

1. A recording apparatus comprising:
   a recording unit that includes a recording head for performing recording, and
   a scanner unit that is provided at an upper side of the recording unit and is moved rotationally so as to open and close the upper side of the recording unit,
   wherein:
   the recording unit includes a carriage that is movable in a scanning direction of the recording head and an inverse roller that inverts a medium on a unit rear portion in a depth direction,
   the scanner unit includes a protrusion that projects from a bottom surface, and
   the carriage, the protrusion, and a rotational movement shaft of the scanner unit are arranged in this order from a unit front side to a unit rear side in the depth direction of the recording unit and the scanner unit, wherein the depth direction is a direction intersecting with the scanning direction of the recording head and the reading unit, and
   the protrusion and the inverse roller are arranged so as to be shifted in the depth direction.

2. The recording apparatus according to claim 1, wherein the protrusion is arranged at a side of the rotational movement shaft relative to a center position of the scanner unit in the depth direction.

3. The recording apparatus according to claim 2, wherein the carriage and the protrusion are overlapped in a height direction of the recording unit and the scanner unit.

4. The recording apparatus according to claim 1, wherein the recording unit includes an inverse unit that inverts the medium on a unit rear portion in the depth direction in a detachable manner, and
   the protrusion is overlapped with a part of the inverse unit in a height direction.

5. The recording apparatus according to claim 1, wherein a transportation path of the medium from the recording head to an outer circumferential surface of the inverse roller is linear when the medium does the reversing transportation.

6. The recording apparatus according to claim 1, wherein a manual feed tray is provided at an upper rear portion of the recording unit, and
   the protrusion is arranged between the manual feed tray and the carriage in the unit front side to the unit rear side direction.

7. The recording apparatus according to claim 1, wherein the protrusion is overlapped with a part of the inverse roller in a height direction.

8. The recording apparatus according to claim 1, wherein a manual feed transportation path which feed medium converges with the inverse roller, wherein the rotational movement shaft is overlapped with the manual feed transportation path in a height direction.

9. The recording apparatus according to claim 1,
wherein a manual feed transportation path which feed medium converges with the inverse roller,
wherein the rotational movement shaft is overlapped with the manual feed transportation path in a depth direction.

\* \* \* \* \*